United States Patent
Jiang et al.

(10) Patent No.: US 12,134,402 B2
(45) Date of Patent: Nov. 5, 2024

(54) PLANNING UNDER PREDICTION WITH CONFIDENCE REGION FOR AN AUTONOMOUS DRIVING VEHICLE

(71) Applicant: Baidu USA LLC, Sunnyvale, CA (US)

(72) Inventors: Shu Jiang, Sunnyvale, CA (US); Yu Cao, Sunnyvale, CA (US); Weiman Lin, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 253 days.

(21) Appl. No.: 17/564,933

(22) Filed: Dec. 29, 2021

(65) Prior Publication Data

US 2023/0202516 A1    Jun. 29, 2023

(51) Int. Cl.
*B60W 60/00*    (2020.01)
*B60W 30/09*    (2012.01)
*B60W 30/095*    (2012.01)
*B60W 40/04*    (2006.01)
*B60W 50/00*    (2006.01)
*G06V 20/58*    (2022.01)

(52) U.S. Cl.
CPC ........ *B60W 60/0011* (2020.02); *B60W 30/09* (2013.01); *B60W 30/0956* (2013.01); *B60W 40/04* (2013.01); *B60W 50/0097* (2013.01); *B60W 60/0015* (2020.02); *B60W 60/00274* (2020.02); *G06V 20/58* (2022.01); *B60W 2554/4041* (2020.02); *B60W 2556/10* (2020.02)

(58) Field of Classification Search
CPC ........ B60W 60/0011; B60W 60/0015; B60W 60/00274; B60W 30/09; B60W 30/0956; B60W 40/04; B60W 50/0097; B60W 2554/4041; B60W 2556/10; G06V 20/58
See application file for complete search history.

(56) References Cited

U.S. PATENT DOCUMENTS

| | | | |
|---|---|---|---|
| 11,810,365 B1 * | 11/2023 | Crego | G06V 20/70 |
| 2019/0056743 A1 * | 2/2019 | Alesiani | G05D 1/0274 |
| 2019/0317515 A1 * | 10/2019 | Zhang | G05D 1/0223 |
| 2019/0318177 A1 * | 10/2019 | Steinberg | G06V 10/60 |
| 2019/0346851 A1 * | 11/2019 | Liu | B60W 60/00276 |
| 2019/0361452 A1 * | 11/2019 | Tahir | G01S 13/56 |
| 2021/0046954 A1 * | 2/2021 | Haynes | B60W 60/00272 |
| 2021/0096571 A1 * | 4/2021 | Modalavalasa | G06V 20/58 |
| 2021/0213978 A1 | 7/2021 | Edling et al. | |
| 2021/0245782 A1 | 8/2021 | Zhu | |

(Continued)

*Primary Examiner* — Hussein Elchanti
*Assistant Examiner* — Kenneth M Dunne
(74) *Attorney, Agent, or Firm* — WOMBLE BOND DICKINSON (US) LLP (57) ABSTRACT

An obstacle is detected based on sensor data obtained from a plurality of sensors of the ADV. A distribution of a plurality of positions of the obstacle at a point of time may be predicted. A range of positions of the plurality of positions of the obstacle may be determined based on a confidence level of the range. A modified shape with a modified length of the obstacle may be determined based on the range of positions of the obstacle. A trajectory of the ADV based on the modified shape with the modified length of the obstacle may be planned. The ADV may be controlled to drive according to the planned trajectory to drive safely to avoid a collision with the obstacle.

21 Claims, 8 Drawing Sheets

(56) References Cited

U.S. PATENT DOCUMENTS

2022/0153276 A1\* 5/2022 Steyer ........................ G06T 7/62
2023/0192077 A1\* 6/2023 Tairbekov ......... B60W 30/0956
　　　　　　　　　　　　　　　　　　701/301

\* cited by examiner

PLANNING UNDER PREDICTION WITH CONFIDENCE REGION FOR AN AUTONOMOUS DRIVING VEHICLE

TECHNICAL FIELD

Embodiments of the present disclosure relate generally to operating autonomous driving vehicles. More particularly, embodiments of the disclosure relate to how to plan a trajectory to avoid an obstacle for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, in certain situations, the prediction of the position of the obstacle in the future may not be so confident. It may be challenging to plan the trajectory of the ADV to avoid a collision with the obstacle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when the prediction is not so confidence about the speed of an obstacle in future, a distribution of possible speeds of the obstacle may be predicted. Based the distribution of possible speeds of the obstacle, a distribution of possible positions of the obstacle may be predicted. The distribution of possible positions may be utilized to determine the region that the obstacle may exist. The obstacle's future shape may be modified based on the region instead of a fixed position. The ADV may plan a trajectory based on the modified future shape of the obstacle to avoid a collision with the obstacle to drive safely.

According to some embodiments, an obstacle is detected based on sensor data obtained from a plurality of sensors of the ADV. A distribution of a plurality of positions of the obstacle at a point of time may be predicted. A range of positions of the plurality of positions of the obstacle may be determined based on a confidence level of the range. A modified shape with a modified length of the obstacle may be determined based on the range of positions of the obstacle. A trajectory of the ADV based on the modified shape with the modified length of the obstacle may be planned. The ADV may be controlled to drive according to the planned trajectory to drive safely to avoid a collision with the obstacle.

In one embodiment, the modified shape with the modified length of the obstacle includes an elongated shape longer than an actual length of the obstacle. In one embodiment, the determining a predicted range of positions of the plurality of positions of the obstacle includes determining the predicted range of positions of the plurality of positions of the obstacle according to a history of velocities of the obstacle.

In one embodiment, the confidence level of the range corresponds to a probability of the obstacle will be within the range. In one embodiment, the predicting a distribution of a plurality of positions of the obstacle in a point of time further includes predicting multiple distributions of a plurality of positions of the obstacle in multiple points of time, each distribution of the plurality of positions of the obstacle corresponding to one point of time.

In one embodiment, the obstacle is a leading obstacle, and the planning a trajectory of the ADV based on the modified shape with the modified length of the obstacle including planning to stop the ADV before a lower bound of the modified shape with the modified length of the obstacle. In one embodiment, the obstacle is a leading obstacle, and the planning a trajectory of the ADV based on the modified shape with the modified length of the obstacle including planning to pass the obstacle on a side based on an upper bound of the modified shape with the modified length of the obstacle.

Figure 1:
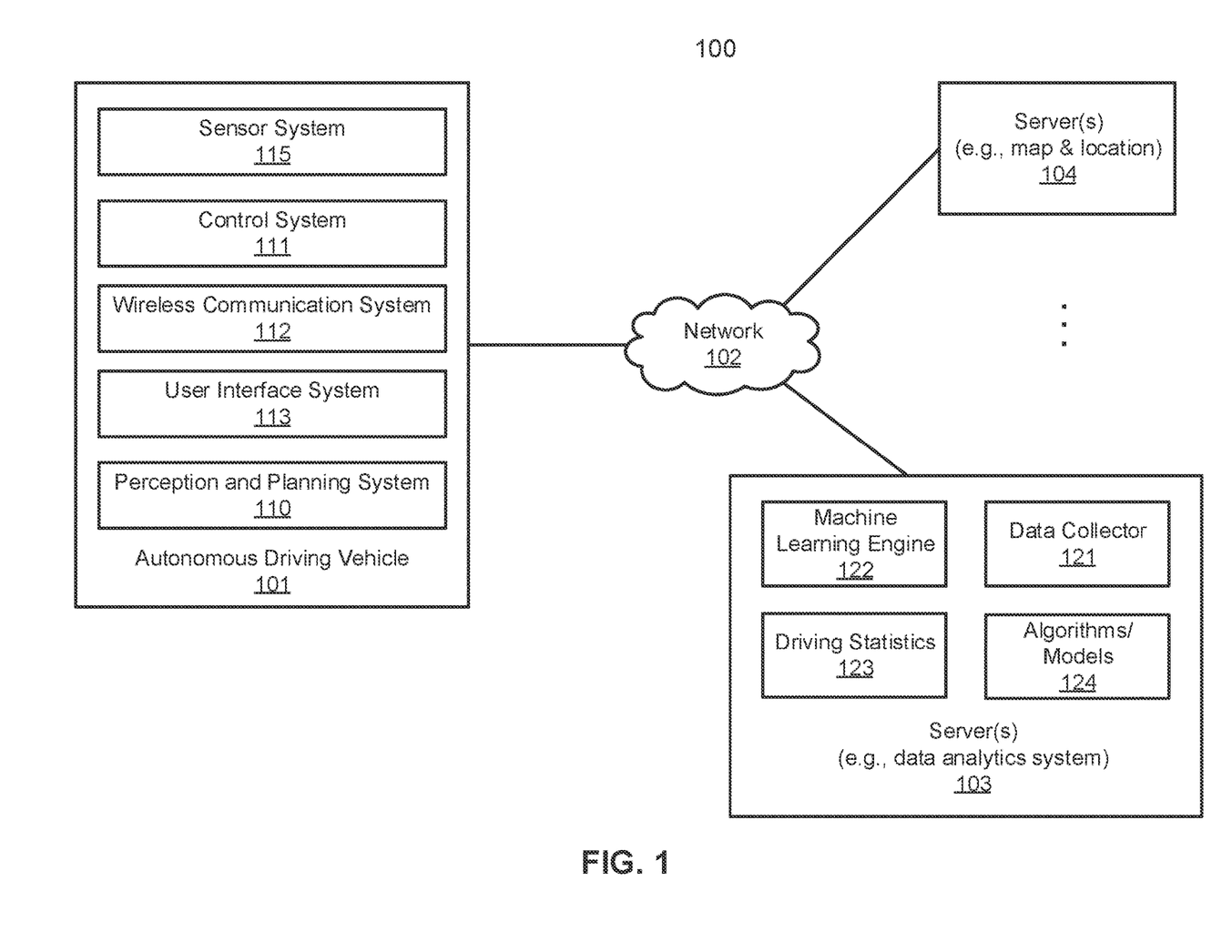
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
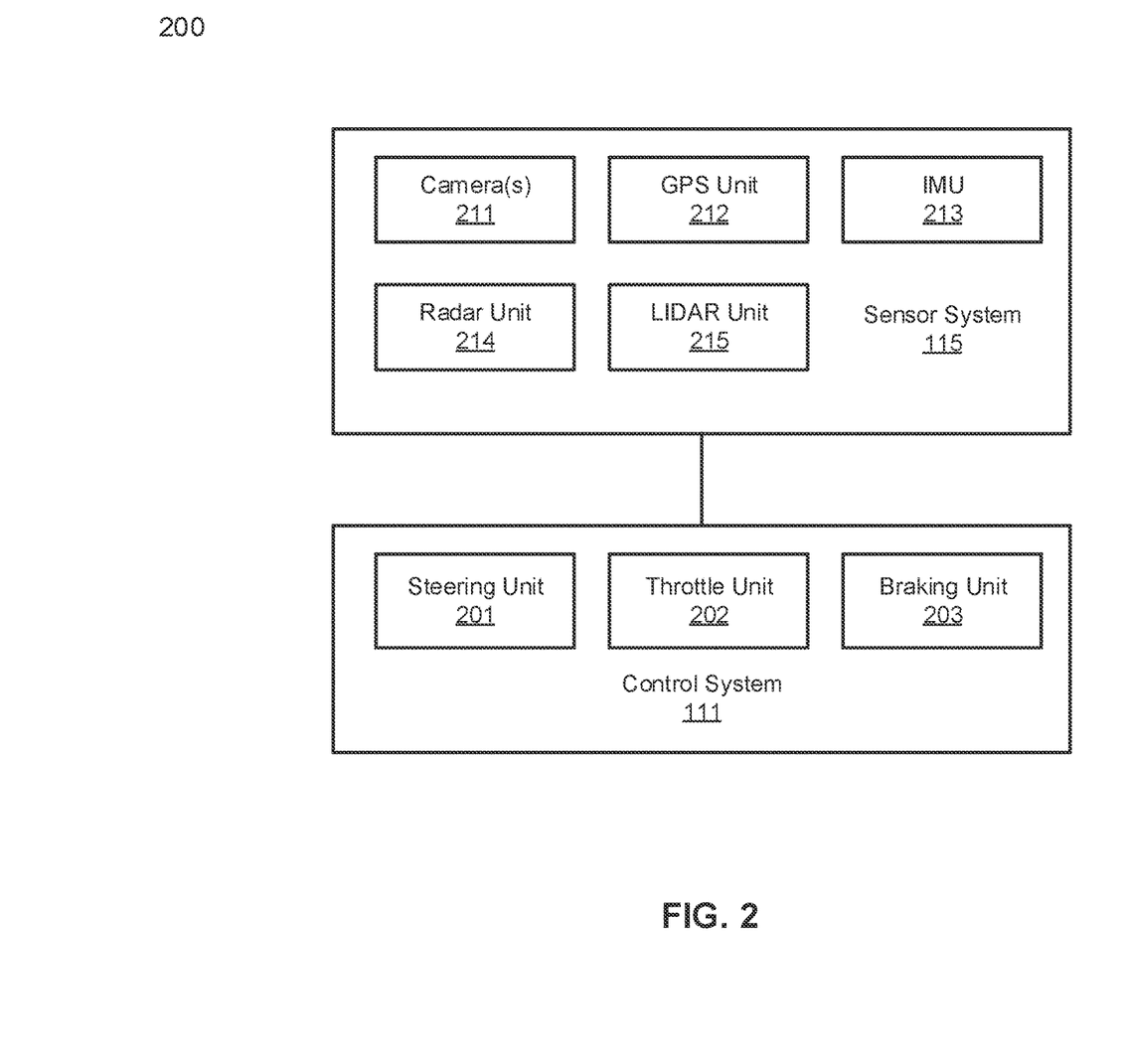
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to detect an obstacle based on sensor data obtained from a plurality of sensors of the ADV, an algorithm or model to predict a distribution of a plurality of positions of the obstacle at a point of time, an algorithm or model to determine a range of positions of the plurality of positions of the obstacle based on a confidence level of the range, an algorithm or model to determine a modified shape with a modified length of the obstacle based on the range of positions of the obstacle, an algorithm or model to plan a trajectory of the ADV based on the modified shape with the modified length of the obstacle, and/or an algorithm or model to control the ADV to drive according to the planned trajectory to drive safely to avoid a collision with the obstacle. Algorithms 124 can then be uploaded on ADVs to be utilized during autonomous driving in real-time.

Figure 3A:
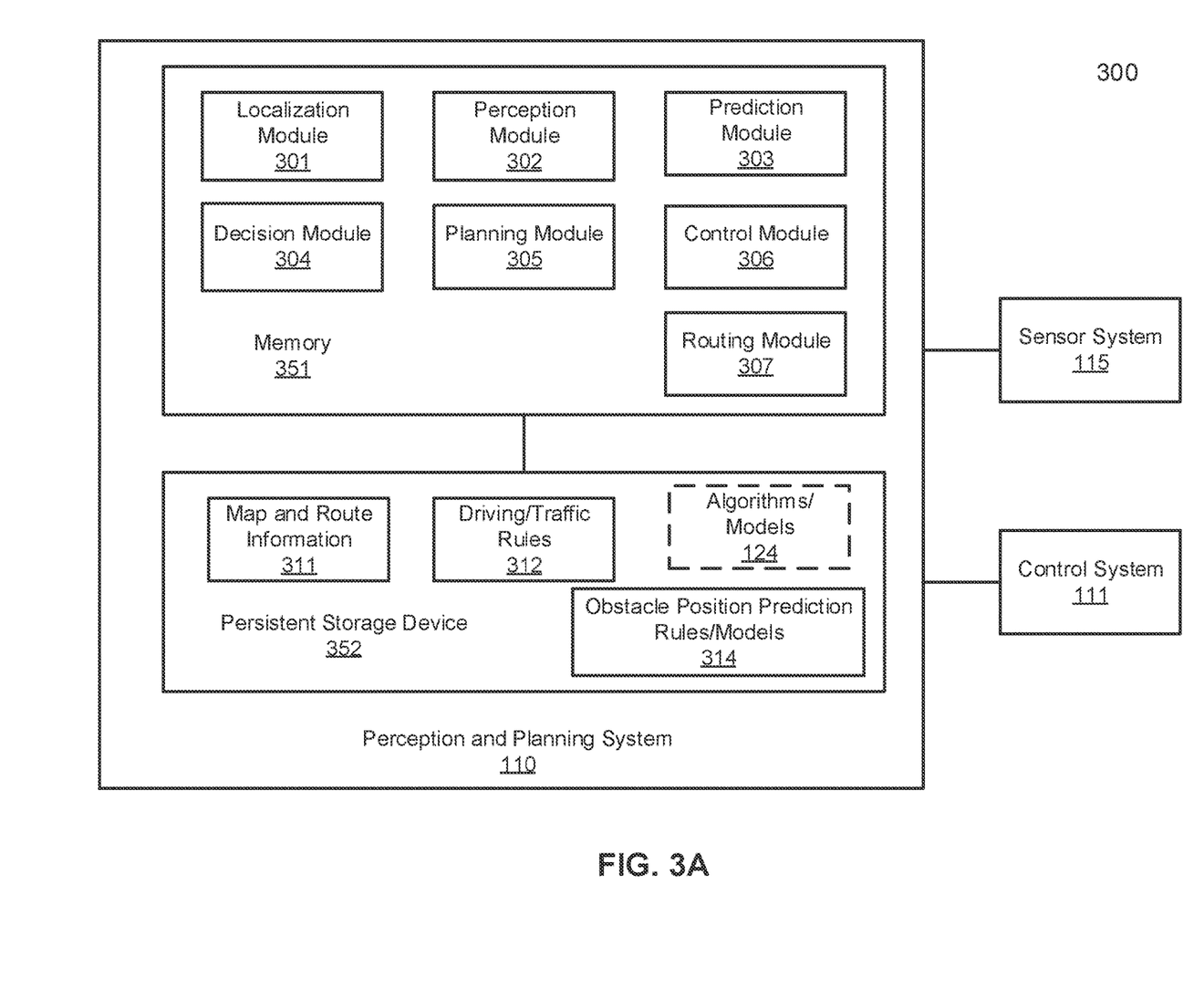
FIGS. 3A-3B are block diagrams illustrating an example of an autonomous driving system used with an autonomous driving vehicle according to one embodiment.
Figure 3B:
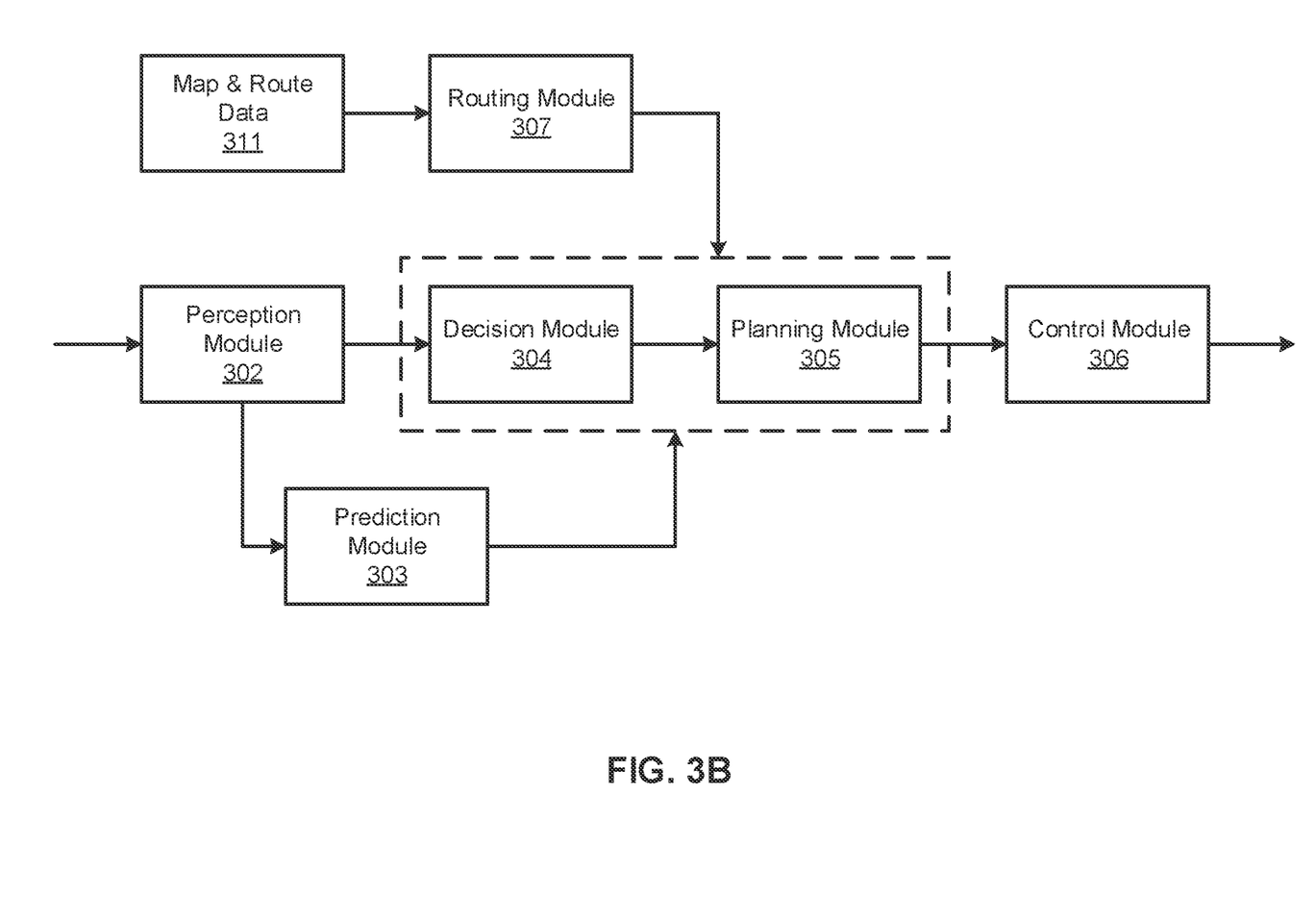

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311, traffic rules 312, and obstacle position prediction rules/models 314. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
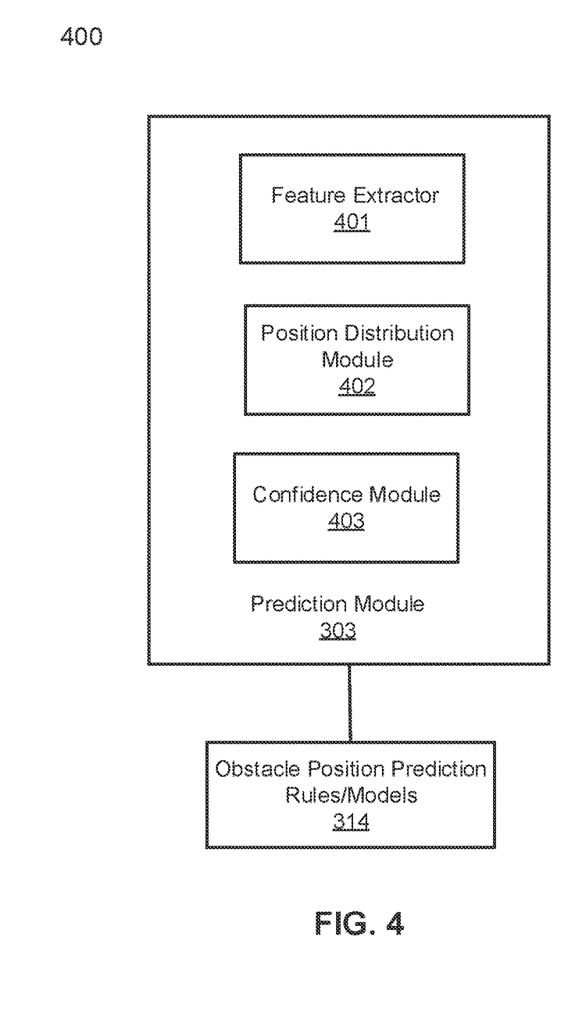
FIG. 4 is a block diagram illustrating an example of a predication module of an autonomous driving vehicle according to one embodiment.

FIG. 4 is a block diagram 400 illustrating an example of a predication module of an autonomous driving vehicle according to one embodiment. Referring to FIG. 4, prediction module 303 includes, but is not limited to, feature extractor 401, position distribution module 402, and confidence module 403, which work together using obstacle position prediction rules/models 314 to predict a distribution of a plurality of positions of the obstacle at a point of time. Note that modules 401-403 may be integrated into fewer number of modules or a single module.

According to one embodiment, the obstacle such as a vehicle is identified and detected. The obstacle may be detected as a part of perception process performed by perception module 302 based on sensor data obtained from various sensors mounted on an ADV such as the sensors as shown in FIG. 2. Based on the perception information, feature extractor 401 is configured to extract the features of the obstacle. Alternatively, the features of the obstacle may be extracted and provided by perception module 302. An obstacle/object may be a vehicle, motorcycle, bicycle, pedestrian, or animal.

According to one embodiment, position distribution module 402 may predict a distribution of a plurality of positions of the obstacle at a point of time.

According to one embodiment, position distribution module 402 may predict multiple distributions of a plurality of positions of the obstacle in multiple points of time, each distribution of the plurality of positions of the obstacle corresponding to a distribution of a plurality of positions of the obstacle at one point of time.

According to one embodiment, confidence module 403 may determine a confidence level of a range of positions of the plurality of positions of the obstacle at the point of time. The confidence level of a range of positions of the plurality of position at a point of time may correspond to a probability that the obstacle may be within the range of positions at the point of time. For example, the confidence level of the range of positions may be 85%, 90%, 95%, etc.

Figure 5:
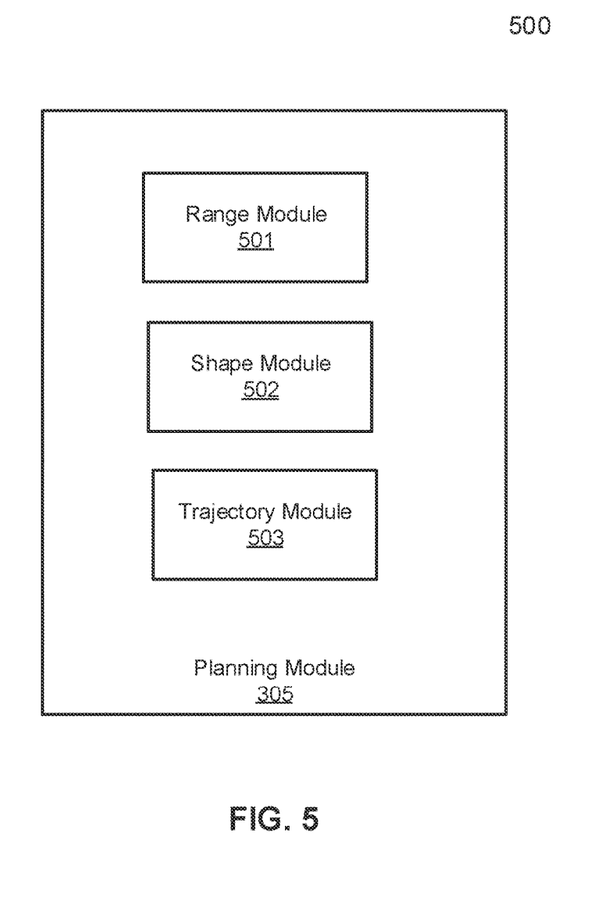
FIG. 5 is a block diagram illustrating an example of a planning module of an autonomous driving vehicle according to one embodiment.

FIG. 5 is a block diagram 500 illustrating an example of a planning module of an ADV according to one embodiment. Referring to FIG. 5, planning module 305 includes, but is not limited to, range module 501, shape module 502 and trajectory module 503, which work together to plan a trajectory based on a modified shape with a modified length of the ADV. Note that modules 501-503 may be integrated into fewer number of modules or a single module.

According to one embodiment, range module 501 may determine a range of positions of the plurality of positions of the obstacle based on a confidence level of the range. For example, range module 501 may determine the predicted range of positions of the plurality of positions of the obstacle according to a history of speeds of the obstacle.

According to one embodiment, shape module 502 may determine a modified shape with a modified length of the obstacle based on the range of positions of the obstacle. The modified shape with the modified length of the obstacle may include an elongated shape longer than an actual length of the obstacle.

According to one embodiment, trajectory module 503 may plan a trajectory of the ADV based on the modified shape with the modified length of the obstacle.

Referring back to FIG. 3A and FIG. 3B, control module 306 may drive the ADV according to the planned trajectory from trajectory module 503 to drive safely to avoid a collision with the obstacle. In this way, the ADV may handle the uncertainty of predicting a future position of the obstacle and the safety of driving may be improved.

Figure 6:
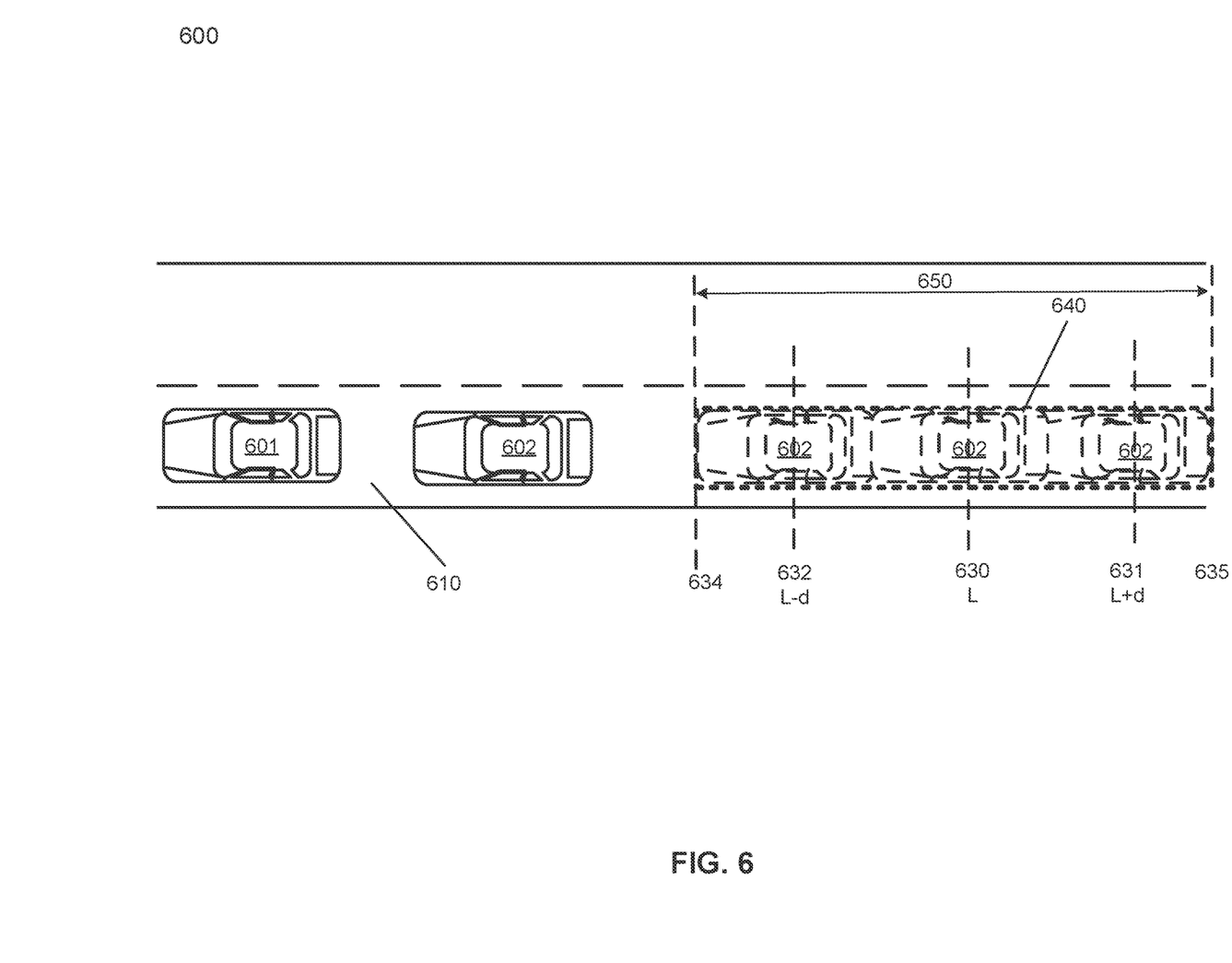
FIG. 6 illustrates an example of planning based on a modified shape of an autonomous driving vehicle according to one embodiment.

FIG. 6 illustrates an example of planning based on a modified shape of an autonomous driving vehicle according to one embodiment. The ADV 601 may drive on a lane 610. The ADV 601 may detect an obstacle 602 (e.g., a moving vehicle) which may be a leading obstacle driving in front of the ADV 601.

Currently, a prediction module of an ADV only outputs a fixed position of an obstacle based on the highest probability of the speed of the obstacle in a future point in time. However, there may be uncertainty in the prediction of the position of the obstacle 602. For example, the obstacle 602 may speed up, or slow down. The prediction of the speed of the obstacle 602 may not be so confident. If the trajectory of the ADV 601 is planned only according to the fixed position in the future point of time, the ADV 601 may not be able to drive safely. As an example, when the obstacle may slow down, the ADV may collide into the obstacle. As another example, when the ADV may try to pass the obstacle from one side, and the obstacle may speed up, the ADV and the obstacle may have a collision.

To address the above problem, the ADV 601 may plan a trajectory based on a modified shape of the obstacle to avoid a collision with the obstacle to drive safely. When the prediction is not so confidence about the speed of the obstacle 602, a distribution of possible speeds of the obstacle 602 may be predicted. Based on the distribution of possible speeds of the obstacle 602, a distribution of possible positions of the obstacle 602 may be predicted. The distribution of possible positions may be utilized to determine the region that the obstacle may exist. The modified shape of the obstacle 602 may be determined based on the region. The ADV 601 may plan the trajectory according to the modified shape of the ADV 602.

As illustrated in FIG. 6, the ADV 601 may be driving on a lane 610. The perception module of the ADV 601 may detect an obstacle 602, e.g., a moving vehicle, which may be a leading obstacle driving on the same lane 610. The prediction module (e.g., 303) of the ADV 601 may predict a distribution of possible speeds of the obstacle 602. The distribution of possible speeds of the obstacle 602 may be determined according to a history of speeds of the obstacle 602. Based on the distribution of possible speeds of the obstacle 602, the prediction module (e.g., 303) of the ADV 601 may predict a list of possible positions of the obstacle 602 and predict a distribution of possible positions of the obstacle 602a future point of time T, as illustrated in FIG. 7.

Figure 7:
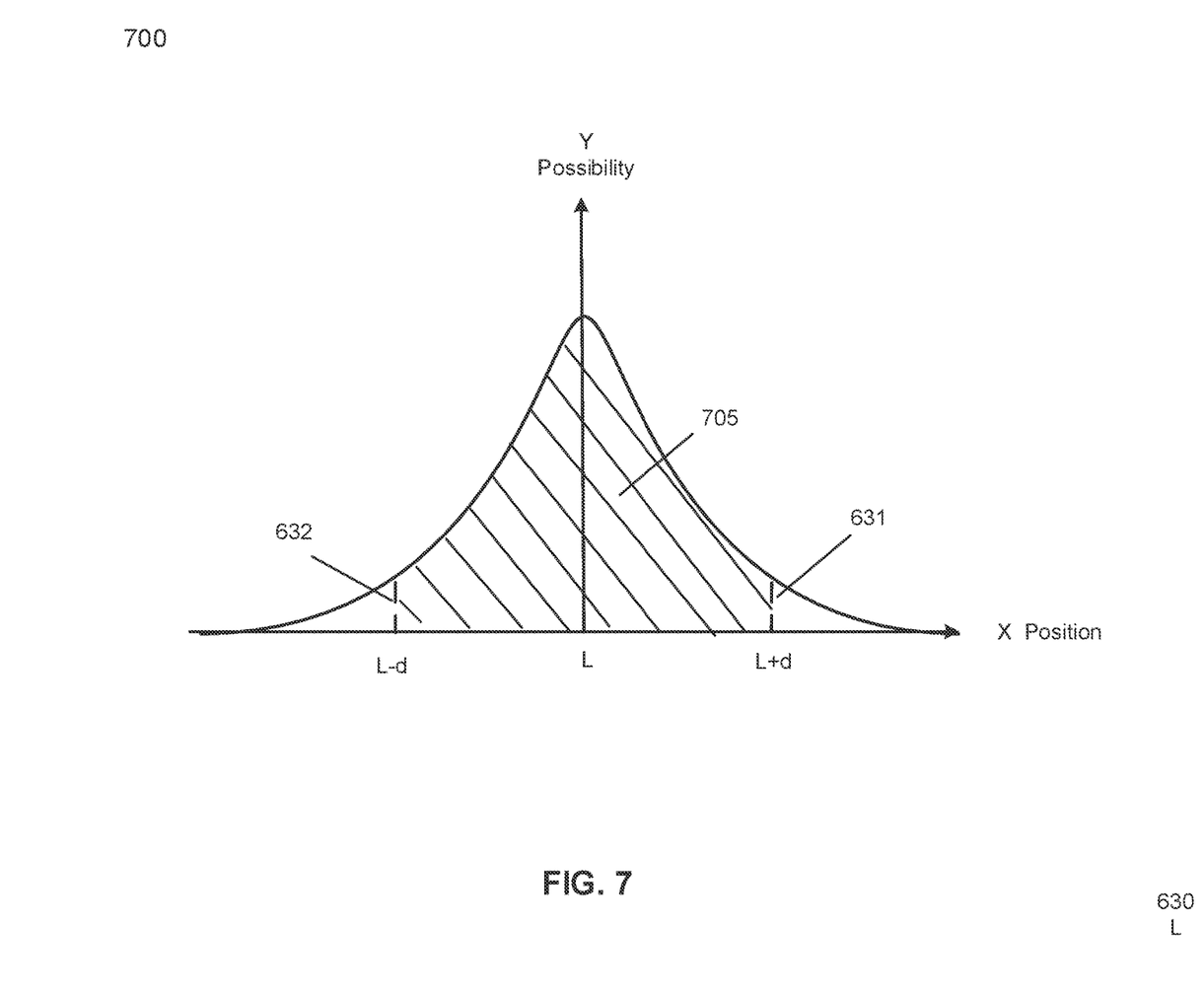
FIG. 7 is a block diagram illustrating an example of predicting a distribution of a plurality of positions of an obstacle for operating an autonomous driving vehicle according to one embodiment.

FIG. 7 is a block diagram 700 illustrating an example of a distribution of a plurality of positions of the obstacle 602 at the point of time T. The X axis represent the position of the obstacle 602, and the Y axis represents the possibility of the obstacle 602 at the corresponding position at the point of time T. The possibility of the obstacle 602 at the corresponding position at the point of time T may be determined based on a history of the velocity and acceleration of the obstacle 602. For example, the possibility of the obstacle 602 at the corresponding position at the point of time T may be determined by using a neutral network, e.g., based on machine learning.

Referring to FIG. 6 and FIG. 7, at the point of time T, the obstacle 602 may drive at a typical speed, and arrive at a position L, or the obstacle 602 may drive at a fast speed, and arrive at a position L+d which corresponding to line 631, or the obstacle 602 may drive at a slow speed, and arrive at a position L−d which corresponding to line 632, etc. The shaded area 705 between line 631 and line 632 represents a confidence level of the range of positions from position L−d to position L+d. The confidence level of the range of positions may correspond to the probability of the obstacle 602 will be positioned within the range.

The ADV 601 may set a predetermined confidence level. For example, the confidence level may be 80%, 85%, 90%, 95%, etc. The confidence level may be any value determined by the ADV 601, not being limited to the above examples values. The ADV 601 may determine a range of positions of the list of positions of the obstacle based on the predetermined confidence level of the range. As an example, the confidence level of the range may be 90%, the ADV 601 may determine the range of positions from position L−d to position L+d have the confidence level of 90%. As illustrated in FIG. 6, with 90% confidence, the obstacle 602 may be between position L−d 632 corresponding to line 632 and position L+d 631 corresponding to line 631. The range of positions may have multiple positions including the slowest position 632 corresponding to a slowest speed of the obstacle within the confidence level and a fastest position 631 of the obstacle within the confidence level.

The ADV 601 may determine a modified shape with a modified length of the obstacle 602 based on the range of positions of the obstacle. The obstacle 602 may be considered to have a modified shape of a region 640 based on the range of positions with the confidence level (e.g., 90%). The region 640 may extend from a closest bound 634 of the slowest position 632 in the range of positions to a farthest bound 635 of the fastest position 631 in the range of positions. The closest bound 634 of the slowest position 632 may be a back end of the obstacle 602 when the obstacle 602 is at the position 632. The farthest bound 635 of the fastest position 631 may be a front end of the obstacle 602 when the obstacle 602 is at the position 631. A modified length 650 of the obstacle 602 may be from the closest bound 634 of the slowest position 632 to the farthest bound 635. As an example, the modified length 650 of the obstacle 602 may be an original length of the obstacle 602 plus the difference between the fastest position 631 and the slowest position 632. The modified shape 640 with the modified length 650 of the obstacle 602 may include an elongated shape longer than an actual length of the obstacle. As an example, a modified width of the obstacle 602 may be an original width of the obstacle 602. As another example, the modified width of the obstacle 602 may be wider than the original width of the obstacle 602.

For different points of time, the ADV 601 may predict different distributions of a plurality of positions of the obstacle 602. The ADV 601 may predict multiple distributions of a plurality of positions of the obstacle at multiple points of time. Each distribution of the plurality of positions of the obstacle corresponding to a distribution of a plurality of positions of the obstacle at one point of time.

The ADV 601 may plan a trajectory based on the modified shape 640 with the modified length 650 of the obstacle. In one embodiment, the ADV 601 may plan to stop before a lower bound 634 of the obstacle 602 with the modified shape 640 and the modified length 650. In one embodiment, the ADV 601 may plan to pass the obstacle 602 on one side based on an upper bound 635 of the obstacle 602 with the modified shape 640 and the modified length 650.

The ADV 601 may constantly update the prediction of the distribution of a plurality of positions of the obstacle 602 at a point of time, and update the range of positions of the plurality of positions of the obstacle based on a confidence level of the range, and update the modified shape with the modified length of the obstacle based on the range of positions of the obstacle, and update the planned trajectory accordingly.

Figure 8:
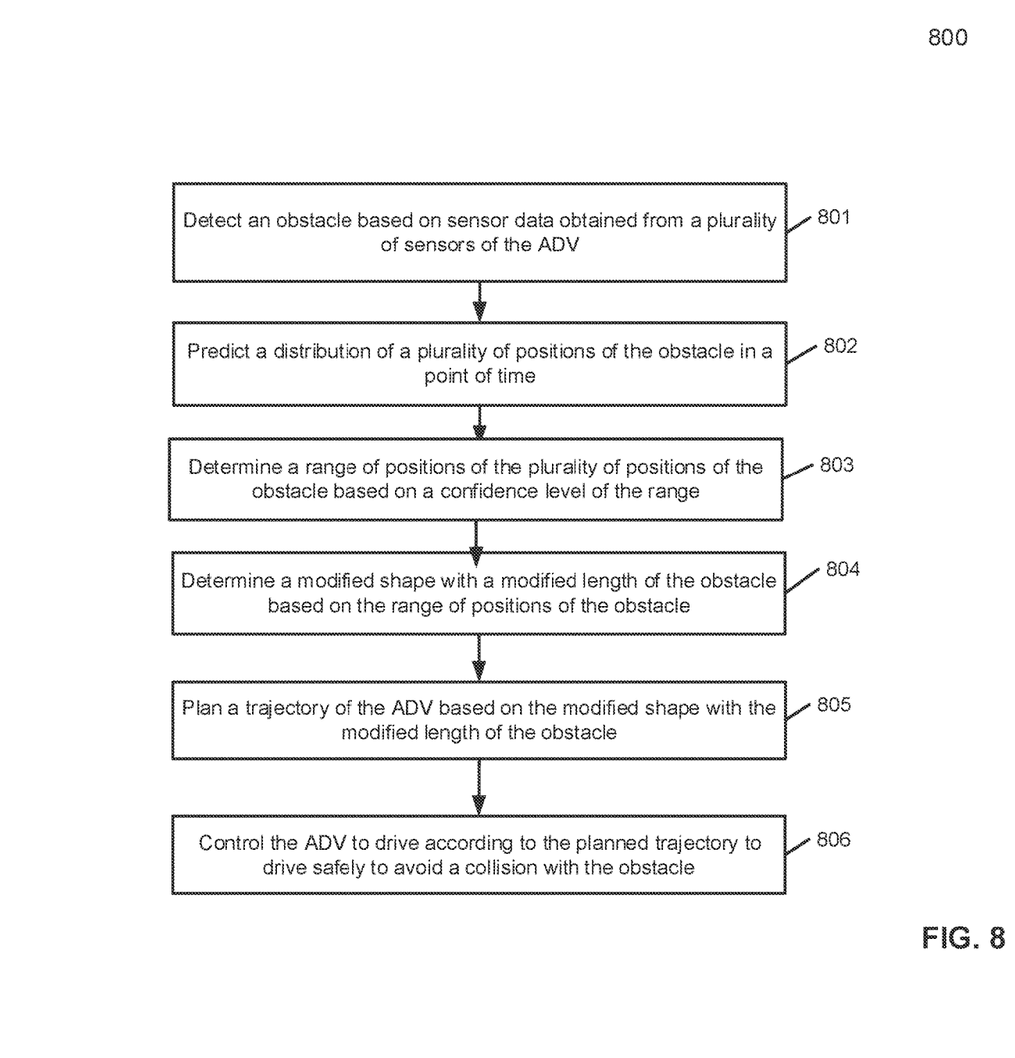
FIG. 8 is a flow diagram illustrating an example of a process for planning based on a modified shape of an autonomous driving vehicle according to one embodiment.

In this way, the ADV 601 may drive safely according to the planned trajectory to avoid a collision with the obstacle. The uncertainty of predicting a future position of the obstacle may be handled and the safety of driving may be improved. FIG. 8 is a flow diagram illustrating an example of a process 800 for planning based on a modified shape of an autonomous driving vehicle according to one embodiment. Process 800 may be performed by processing logic which may include software, hardware, or a combination thereof. For example, process 800 may be performed by prediction module 303 and planning module 305.

Referring to FIG. 8, in operation 801, processing logic detects an obstacle based on sensor data obtained from a plurality of sensors of the ADV. For example, the processing logic may perceive a driving environment surrounding the ADV based on sensor data obtained from various sensors mounted on the ADV (e.g., LIDAR, RADAR, cameras) and generates perception data describing the driving environment. The processing logic may detect the obstacle based on the perception data.

In operation 802, the processing logic predicts a distribution of a plurality of positions of the obstacle at a point of time.

In operation 803, the processing logic determines a range of positions of the plurality of positions of the obstacle based on a confidence level of the range.

In operation 804, the processing logic determines a modified shape with a modified length of the obstacle based on the range of positions of the obstacle.

In operation 805, the processing logic plans a trajectory of the ADV based on the modified shape with the modified length of the obstacle.

In operation 806, the processing logic controls the ADV to drive according to the planned trajectory to drive safely to avoid a collision with the obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   detecting an obstacle based on sensor data obtained from a plurality of sensors of the ADV;

predicting a distribution of a plurality of positions of the obstacle at a point of time;

determining a range of positions of the plurality of positions of the obstacle based on a confidence level of the range;

determining a modified shape with a modified length of the obstacle based on the range of positions of the obstacle;

planning a trajectory of the ADV based on the modified shape with the modified length of the obstacle; and controlling the ADV to drive according to the planned trajectory to drive safely to avoid a collision with the obstacle.

2. The method of claim 1, wherein the modified shape with the modified length of the obstacle includes an elongated shape longer than an actual length of the obstacle.

3. The method of claim 1, wherein the determining a predicted range of positions of the plurality of positions of the obstacle includes determining the predicted range of positions of the plurality of positions of the obstacle according to a history of velocity and acceleration of the obstacle.

4. The method of claim 1, wherein the confidence level of the range corresponds to a probability of the obstacle will be within the range.

5. The method of claim 1, wherein the predicting a distribution of a plurality of positions of the obstacle in a point of time further includes predicting multiple distributions of a plurality of positions of the obstacle at multiple points of time, each distribution of the plurality of positions of the obstacle corresponding to a distribution of a plurality of positions of the obstacle at one point of time.

6. The method of claim 1, wherein the obstacle is a leading obstacle, and wherein the planning a trajectory of the ADV based on the modified shape with the modified length of the obstacle including planning to stop the ADV before a lower bound of the modified shape with the modified length of the obstacle.

7. The method of claim 1, wherein the obstacle is a leading obstacle, and wherein the planning a trajectory of the ADV based on the modified shape with the modified length of the obstacle including planning to pass the obstacle on a side based on an upper bound of the modified shape with the modified length of the obstacle.

8. A non-transitory machine-readable medium having instructions stored therein, which when executed by a processor, cause the processor to perform operations of operating an autonomous driving vehicle (ADV), the operations comprising:

detecting an obstacle based on sensor data obtained from a plurality of sensors of the ADV;

predicting a distribution of a plurality of positions of the obstacle at a point of time;

determining a range of positions of the plurality of positions of the obstacle based on a confidence level of the range;

determining a modified shape with a modified length of the obstacle based on the range of positions of the obstacle;

planning a trajectory of the ADV based on the modified shape with the modified length of the obstacle; and controlling the ADV to drive according to the planned trajectory to drive safely to avoid a collision with the obstacle.

9. The non-transitory machine-readable medium of claim 8, wherein the modified shape with the modified length of the obstacle includes an elongated shape longer than an actual length of the obstacle.

10. The non-transitory machine-readable medium of claim 8, wherein the operations further comprise determining the predicted range of positions of the plurality of positions of the obstacle according to a history of velocity and acceleration of the obstacle.

11. The non-transitory machine-readable medium of claim 8, wherein the confidence level of the range corresponds to a probability of the obstacle will be within the range.

12. The non-transitory machine-readable medium of claim 8, wherein the operations further comprise predicting multiple distributions of a plurality of positions of the obstacle at multiple points of time, each distribution of the plurality of positions of the obstacle corresponding to a distribution of a plurality of positions of the obstacle at one point of time.

13. The non-transitory machine-readable medium of claim 8, wherein the obstacle is a leading obstacle, and wherein the operations further comprise planning to stop the ADV before a lower bound of the modified shape with the modified length of the obstacle.

14. The non-transitory machine-readable medium of claim 8, wherein the obstacle is a leading obstacle, and wherein the operations further comprise planning to pass the obstacle on a side based on an upper bound of the modified shape with the modified length of the obstacle.

15. A data processing system, comprising:

a processor; and a memory coupled to the processor to store instructions, which when executed by the processor, cause the processor to perform operations of operating an autonomous driving vehicle (ADV), the operations including detecting an obstacle based on sensor data obtained from a plurality of sensors of the ADV;

predicting a distribution of a plurality of positions of the obstacle at a point of time;

determining a range of positions of the plurality of positions of the obstacle based on a confidence level of the range;

determining a modified shape with a modified length of the obstacle based on the range of positions of the obstacle;

planning a trajectory of the ADV based on the modified shape with the modified length of the obstacle; and controlling the ADV to drive according to the planned trajectory to drive safely to avoid a collision with the obstacle.

16. The data processing system of claim 15, wherein the modified shape with the modified length of the obstacle includes an elongated shape longer than an actual length of the obstacle.

17. The data processing system of claim 15, wherein the operations further comprise determining the predicted range of positions of the plurality of positions of the obstacle according to a history of velocity and acceleration of the obstacle.

18. The data processing system of claim 15, wherein the confidence level of the range corresponds to a probability of the obstacle will be within the range.

19. The data processing system of claim 15, wherein the operations further comprise predicting multiple distributions of a plurality of positions of the obstacle at multiple points of time, each distribution of the plurality of positions of the obstacle corresponding to a distribution of a plurality of positions of the obstacle at one point of time.

20. The data processing system of claim 15, wherein the obstacle is a leading obstacle, and wherein the operations further comprise planning to stop the ADV before a lower bound of the modified shape with the modified length of the obstacle.

21. The data processing system of claim 15, wherein the obstacle is a leading obstacle, and wherein the operations further comprise planning to pass the obstacle on a side based on an upper bound of the modified shape with the modified length of the obstacle.

* * * * *